UNITED STATES PATENT OFFICE.

MYRTIL KAHN, OF ELBERFELD, AND RICHARD KOTHE, OF VOHWINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

No. 865,253.      Specification of Letters Patent.      Patented Sept. 3, 1907.

Application filed June 5, 1907. Serial No. 377,325.

*To all whom it may concern:*

Be it known that we, MYRTIL KAHN and RICHARD KOTHE, doctors of philosophy, chemists, citizens of the German Empire, residing at, respectively, Elberfeld and Vohwinkel, near Elberfeld, in the Kingdom of Prussia, Germany, have invented new and useful Improvements in new Azo Dye, of which the following is a specification.

We have found that a new and valuable azo dyestuff is obtained by combining the diazo compound of 4-chloro-2-aminophenol-6-sulfonic acid with 1-naphthol-4-sulfonic acid.

In carrying out the new process practically we can proceed as follows, the parts being by weight: 22.4 parts of 4-chloro-2-aminophenol-6-sulfonic acid are diazotized in the usual manner by means of hydrochloric acid and 7 parts of sodium nitrite. The diazo compound is then poured into a solution of 25 parts of the sodium salt of 1-naphthol-4-sulfonic acid, to which sufficient sodium carbonate has been added to maintain the reaction alkaline throughout the whole process. The dyestuff is salted out, pressed and dried. It is, after being dried and pulverized, in the shape of its sodium salt a dark powder soluble in water with a reddish-violet color and in concentrated sulfuric acid with a reddish-violet color. By reduction with stannous chlorid and hydrochloric acid 4-chloro-2-aminophenol-6-sulfonic acid and 2-amino-1-naphthol-4-sulfonic acid is obtained. The new dyestuff dyes wool from acid baths a bluish-red shade which is changed to a fast bluish-violet when chromed after dyeing.

Having now described our invention and in what manner the same is to be performed, what we claim as new and desire to secure by Letters Patent is:—

The herein-described new azo-dyestuff, which can be obtained by combining diazotized 4-chloro-2-aminophenol-6-sulfonic acid with 1-naphthol-4-sulfonic acid, which dyestuff is, after being dried and pulverized in the shape of its sodium salt a dark powder soluble in water with a reddish-violet color and in concentrated sulfuric acid with a reddish-violet color; yielding upon reduction with stannous chlorid and hydrochloric acid 4-chloro-2-aminophenol-6-sulfonic acid and 2-amino-1-naphthol-4-sulfonic acid; and dyeing wool from acid baths bluish-red shades which are changed to bluish-violet when chromed after dyeing, substantially as hereinbefore described.

In testimony whereof we have hereunto set our hands in the presence of two subscribing witnesses.

MYRTIL KAHN. [L. S.]
RICHARD KOTHE. [L. S.]

Witnesses:
 OTTO KÖNIG,
 AUG. LANDSIEDEL.